March 27, 1945.   H. NAGEL   2,372,223

COUPLING DEVICE FOR CAMERA ATTACHMENTS

Filed March 1, 1944

INVENTOR.
HENRYK NAGEL.
BY
Leon M. Strauss

Patented Mar. 27, 1945

2,372,223

UNITED STATES PATENT OFFICE 2,372,223

COUPLING DEVICE FOR CAMERA ATTACHMENTS

Henryk Nagel, Bronx, N. Y., assignor to Practo Photo Accessories Corp., Brooklyn, N. Y., a corporation of New York Application March 1, 1944, Serial No. 524,553

5 Claims. (Cl. 88—1)

This invention relates generally to improvements in or relating to coupling devices and more especially to devices of this nature for use in connection with cameras and parts thereof.

It is one of the objects of this invention to provide means for coupling parts of cameras and the like, which means are inexpensive to manufacture, efficient and practical in use and operation, and easy in manipulation.

It is another object of the invention to provide means affording uniform, close and firm surface engagement with one part which is to be coupled to another part.

It is still another object of the present invention to provide adjustable coupling or attaching means fitted for being applied to or over a part or parts of various dimensions and assuring in adjusted or operative position on said parts even and uninterrupted surface contact therewith.

It is a further object of this invention to provide means capable of frictionally engaging or embracing a relatively short and smooth, preferably cylindrical surface on which said means may be tightened, thereby permitting speedy coupling between mechanical parts preferable of cameras which parts may have different diameters with respect to one another.

Yet, a further object of this invention is to provide coupling means which are well adapted to fit standard constructions of lens barrels of cameras and to removably connect the latter with optical means, such as a light filter, lens shade and other light regulating or conditioning means.

With these objects in view, the invention consists in certain features of novelty in the construction, combination and arrangement of parts by which the aforesaid and several other objects, hereinafter set forth, are effected, all as fully described with reference to the accompanying drawing in which.

Figure 1:
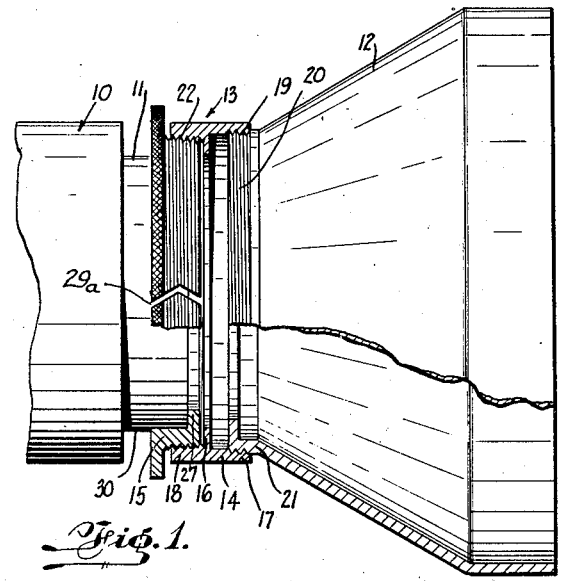
Fig. 1 is a side elevation of the coupling device made in accordance with this invention, illustrated partly in section and applied to a lens barrel of a camera (not shown) to connect the same with a lens shade, parts being broken away.

Referring now in particular to the drawing, there is shown in Fig. 1 and indicated by numeral 10, the forward part of a camera with lens carrier barrel 11 on which a lens shade 12 or other light regulating means is to be removably attached, as will be described hereinafter in further detail.

Figures 2, 3, 4, 5:
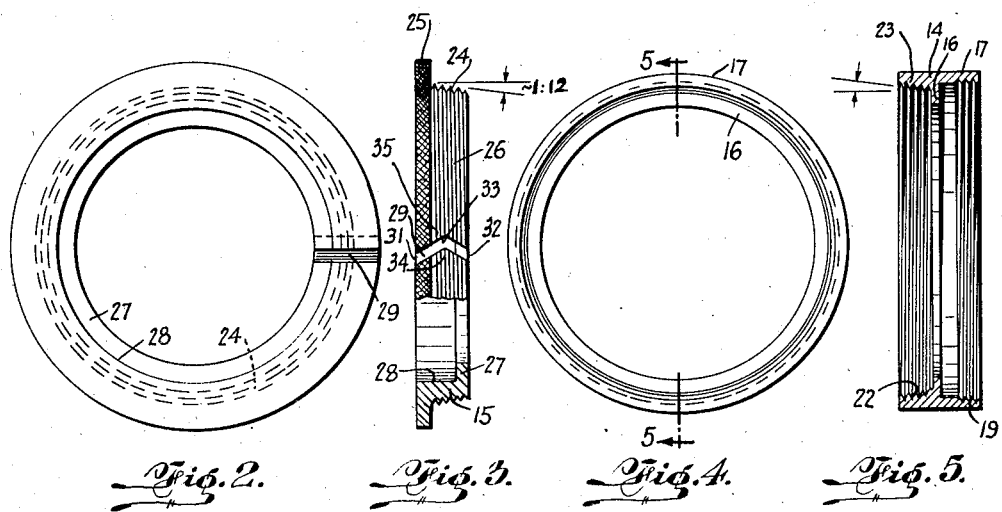
Fig. 2 is a front elevational view.
Fig. 3 is a side elevational view, partly in section, of the sleeve of the coupling device made in accordance with this invention.
Fig. 4 is a front elevation.
Fig. 5 is a sectional view taken along line 5—5 of Fig. 4, of the holding member employed with the coupling device.

To this end, a coupling device 13 is provided which is adapted to engage shade 12 or any other tubular member and to connect the same with lens barrel 11. Coupling device 13 consists of a holding member 14 and a sleeve member 15. Holding member 14 is tubular in cross-section and is provided with an inner annular rim 16, dividing holding member 14 into a forward portion 17 and a rearward portion 18. Tubular forward portion 17 has inner threads 19 adapted to engage threads 20 provided at the outer extremity 21 of lens shade 12. Holding member 14 is further provided with threads 22 at the rearward portion 18. Threads 22 are tapered and extend along inner wall 23 of rearward portion 18 of said holding member 14 (Fig. 5). Sleeve member 15 has an outer tapered wall with threads 24 adapted to engage with said threads 22 for a purpose about to be described.

Sleeve member 15 consists of a knurled portion 25 which extends beyond the threaded sleeve portion 26 and is adapted for manipulation by the fingers of a hand of an operator. Sleeve portion 26 terminates into an abutment or ring portion 27.

Sleeve member 15 has further an inner reduced gripping surface 28 of cylindrical shape extending from said ring portion 27 to the opposite end of said sleeve, and is adapted to engage the outer cylindrical and smooth surface 30 of lens barrel 11, as can be clearly seen in Fig. 1. The inner gripping or coupling surface 28 of sleeve member 15 may preferably be prepared to enhance the gripping action thereof and may be therefore provided with any appropriate coating or roughening (not shown).

Figure 6:
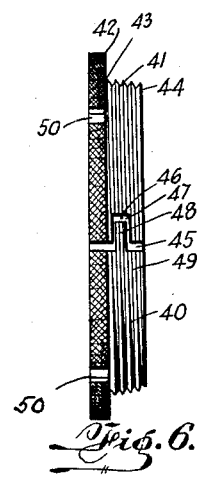
Fig. 6 is a side elevation of a coupling sleeve in modified form.

As can be seen in Figs. 1 to 3, sleeve member 15 is provided with an inverted V-shaped slot 29 which extends from the outer ends 31 and 32 toward the median part of sleeve member 15 providing an apex at 33. It is well understood that this slot may be straight or may be differently shaped (such as shown in Fig. 6), but it is preferred to use the mentioned V-shaped slot for the purpose of positively guiding the spaced-apart split ends of sleeve member 15 when the latter is brought into threaded engagement at 22 with holding member 14.

It may be easily realized that when sleeve member 15 engages the threads 22 of holding member 14, the split ends 34, 35 will approach each other, thus the distance between said ends will be reduced to thereby urge gripping surface 28 of sleeve member 15 on surface 30 of the lens barrel 11 whereby a close, tight and uniform surface contact is brought about. It will be understood, that slot 29 will become smaller as at 29a, when sleeve 15 is screwed home, whereas upon loosening of sleeve member 15 as by unscrewing, shade 12 together with the coupling device 13 may be removed from the lens barrel 11 and can be adjustably disposed on another size of barrel or other camera member.

The rate of tapering of the screw-threaded sleeve member 15 may be, for example, in proportion of 1:12 inches.

It is to be observed that instead of shade 12 a light filter (not shown) or other light conditioning or optical means for use in connection with cameras may be secured to holding member 14. It is further well understood that forward part 17 of holding member 14 may be shaped and equipped similarly to rearward portion 18 and may be adapted to engage a further split ring or sleeve member to couple a tubular element, such as an extension tube, therewith.

Fig. 6 shows a modified sleeve member 40 provided with tapered threads 41 declining from knurled portion 42 at 43 toward the forward end 44. The split portion of sleeve 40 may be, for example, stamped out or shaped in any other appropriate manner to provide slot 45. Slot 45 of the split sleeve member 40 is U-shaped at 46 whereby slot portion 47 accommodates projec-guiding the free spaced-apart ends of split sleeve tion 48 of sleeve portion 49 for the purpose of member relatively to one another. Knurled sleeve portion 42 may be provided with cut outs 50, such as slots or holes for the engagement of a tool (not shown) when it is desired to fasten or tighten the sleeve member 40 in the aforesaid holding member.

It is well understood that holding or retainer member 14 may consist of a single tubular element without the inner annular rim 16. It can thus be seen that according to the present invention there is obtained a device for attaching light regulating means to the lens barrel of a camera and for removal therefrom, which device comprises a tubular member for holding said regulating means, a sleeve member adapted for positioning intermediate said holding member and said lens barrel and being shorter in length than said holding member and said barrel, and an abutment provided at one end of said sleeve member for engagement with the forward end of said barrel, said sleeve member being provided with an outer tapered wall having threads and with an inner tubular wall terminating into said abutment, said holding member having an inner tapered wall having threads for engagement with said threads of said outer tapered wall of said sleeve member, said sleeve member being provided with spaced apart split ends having a substantially central recess and a projection, respectively, to impede lateral movement of said ends relatively to each other, when said holding member is brought in engagement with said sleeve member whereby the distance between said split ends is reduced and said sleeve member is contracted to thereby frictionally engage by means of its inner wall the surface of said forward end of said barrel.

While there has been shown and described and pointed out the fundamental novel features of the invention as applied to the above embodiments, it will be understood that various admissions and substitutions and changes in the form and details of the device illustrated and its operation may be made by those skilled in the art without departing from the spirit of the invention.

Having thus described the invention what is claimed as new and desired to be secured by Letters Patent, is:

1. A device for attaching light regulating means to the lens barrel of a camera and for removal therefrom; comprising a tubular member for holding said regulating means, a sleeve member adapted for positioning intermediate said holding member and said lens barrel and being shorter in length than said holding member and said barrel, and a ring portion provided at one end of said sleeve member and forming an abutment for the end of said barrel when said sleeve member is in engagement with said barrel, said sleeve member being provided with an outer tapered wall having threads and with an inner substantially cylindrical wall terminating into said ring portion, said holding member having an inner tapered wall having threads for engagement with said threads of said outer tapered wall of said sleeve member, said sleeve member being provided with spaced-apart split ends, whereby upon said engagement of said holding member with said sleeve member the distance between said split ends is reduced and said sleeve member is contracted to thereby frictionally embrace by means of its inner wall said end of said barrel.

2. A device for attaching light regulating means to the lens barrel of a camera and for removal therefrom; comprising a tubular member for holding said regulating means, a sleeve member adapted for positioning intermediate said holding member and said lens barrel and being shorter in length than the said holding member and said barrel, and an abutment provided at one end of said sleeve member for engagement with the forward end of said barrel, said sleeve member being provided with an outer tapered wall having threads and with an inner tubular wall terminating into said abutment, said holding member having an inner tapered wall having threads for engagement with said threads of said outer tapered wall of said sleeve member, said sleeve member being provided with spaced-apart split ends, whereby upon said engagement of said holding member with said sleeve member the distance between said split ends is reduced and said sleeve member is contracted to thereby frictionally embrace by means of its inner wall said end of said barrel.

3. A device for attaching light regulating means to the lens barrel of a camera and for removal therefrom; comprising a member for holding said regulating means, a sleeve member adapted for positioning intermediate said holding member and said lens barrel and being shorter in length than said holding member and said barrel, and an abutment provided at one end of said sleeve member for engagement with the forward end of said barrel, said sleeve member being provided with an outer tapered wall having threads and with an inner tubular wall terminating into said abutment, said holding member having an inner tapered wall having threads for engagement with said threads of said outer tapered wall of said sleeve member, said sleeve member being provided with spaced-apart split ends, having a substantially central recess and a projection, respectively, to impede lateral movement of said ends relatively to each other, when said holding member is brought in engagement with said sleeve member, whereby the distance between said split ends is reduced and said sleeve member is contracted to thereby frictionally engage by means of its inner wall the surface of said forward end of said barrel.

4. A device for attaching light regulating means to the lens barrel of a camera and for removal therefrom; comprising a member for holding said regulating means, a sleeve member adapted to fit over the free end of said lens barrel, said sleeve member having an inner wall and an outer wall, an abutment provided on the inner wall of said sleeve member for engagement with said end of said barrel, said outer wall of said sleeve member being tapered and having threads, said inner wall of said sleeve member being tubular and terminating into said abutment, said holding member having an inner tapered wall having threads for engagement with said threads of said outer tapered wall of said sleeve member, said sleeve member having a substantially horizontally directed slit providing spaced-apart split ends, said ends of said sleeve member terminating into a projection and a recess, respectively, to impede movement of said ends in horizontal direction, whereby upon said engagement of said holding member with said sleeve member the distance between said split ends is reduced and said sleeve member is contracted to thereby frictionally engage the outer surface of said barrel adjacent the free end of the latter.

5. A device for attaching light regulating means to the lens barrel of a camera and for removal therefrom; comprising a member for holding said regulating means, a sleeve member adapted to fit over the free end of said lens barrel and for positioning between said lens barrel and said holding member, said sleeve member having an inner wall and an outer wall, an abutment provided on the inner wall of said sleeve member for engagement with said end of said barrel, said outer wall of said sleeve member being tapered and having threads, said inner wall of said sleeve member being tubular and terminating into said abutment, said holding member having an inner tapered wall having threads for engagement with said threads of said outer tapered wall of said sleeve member, said sleeve member having spaced-apart split ends and being provided with a knurled portion projecting beyond the outer surface of said free end of said lens barrel and said holding member to facilitate manipulation of said sleeve member, whereby upon engagement of said holding member with said sleeve member the distance between said split ends is reduced and said sleeve member is contracted to thereby frictionally engage said surface of said lens barrel adjacent the free end of the latter.

HENRYK NAGEL.